(12) United States Patent
Koch et al.

(10) Patent No.: US 6,207,270 B1
(45) Date of Patent: Mar. 27, 2001

(54) TRANSPARENT COVER PLATE OF PLASTIC FOR MOTOR VEHICLE HEADLIGHT, AND METHOD OF PRODUCING THE SAME

(75) Inventors: Ekkehard Koch, Stuttgart; Albin Gugl, Metzingen; Thomas Keck, Pfullingen; Hans-Georg Fritz, Ostfildern, all of (DE)

(73) Assignees: Robert Bosch Stewart; Karl Worwag GmbH & Co., both of Stuttgart (DE)

( * ) Notice: Subject to any disclaimer, the term of this patent is extended or adjusted under 35 U.S.C. 154(b) by 0 days.

(21) Appl. No.: 08/388,745

(22) Filed: Feb. 15, 1995

(30) Foreign Application Priority Data

Mar. 11, 1994 (DE) .................................................. 44 08 230

(51) Int. Cl.⁷ ...................................................... B32B 5/16
(52) U.S. Cl. ...................... 428/336; 428/423.1; 428/515; 428/543
(58) Field of Search ..................................... 428/332, 515, 428/423.1, 543, 336, 918

(56) References Cited

U.S. PATENT DOCUMENTS

| | | | | |
|---|---|---|---|---|
| 3,675,004 | * | 7/1972 | Gulbrasen et al. | 431/360 |
| 3,865,904 | * | 2/1975 | Wingler et al. | 280/901 |
| 4,126,564 | * | 11/1978 | Peters et al. | 524/387 |
| 4,126,594 | * | 11/1978 | Peters et al. | 524/289 |
| 4,246,380 | * | 1/1981 | Gras et al. | 525/440 |
| 4,746,366 | * | 5/1988 | Philipp et al. | 106/287.19 |
| 4,910,380 | * | 3/1990 | Reiss et al. | 219/203 |
| 5,397,844 | * | 3/1995 | Fischer et al. | 525/282 |
| 5,510,444 | * | 4/1996 | Halpaap et al. | 528/45 |

FOREIGN PATENT DOCUMENTS 2748358   3/1979   (DE) .

* cited by examiner

*Primary Examiner*—H. Thi Le
(74) *Attorney, Agent, or Firm*—Michael J. Striker

(57) ABSTRACT

A transparent cover plate composed of a synthetic plastic material and utilized for a motor vehicle headlight or another light source is provided on an outer side with a coating of a transparent synthetic plastic material which is a burnt powder lacquer.

12 Claims, No Drawings

TRANSPARENT COVER PLATE OF PLASTIC FOR MOTOR VEHICLE HEADLIGHT, AND METHOD OF PRODUCING THE SAME

BACKGROUND OF THE INVENTION

The present invention relates to a transparent cover plate of a synthetic plastic material for a headlight of a motor vehicle and other light sources, which is provided at least at its outer side with a coating of a transparent synthetic plastic, as well as to a method of producing the transparent cover plate.

Cover plates for motor vehicle headlights are usually composed of glass. For the reason of accurate shaping of dispersing and lens elements as well as for the reason of the weight saving, cover plates are increasingly produced of synthetic plastic materials. Synthetic plastic materials suitable for this purpose are usually polycarbonate, aromatic modifiers polycarbonate (APEC) and polymethylacrylmethylimide (PMMI), which however require a surface improvement to satisfy corresponding requirements with respect to scratch resistance, stone impact resistance, weather resistance and resistance to solvents, fuels and oil.

German document DE-A-27 48 358 discloses a method of improving the surface layer of the cover plate of synthetic plastic material. The treatment is performed directly on the synthetic plastic of the cover plate, for example in form of a subsequent hardening.

In older time the coating of the synthetic plastic cover plates with a hardenable lacquer was used. The lacquer is applied in several layers until the desired layer thickness is formed. Lacquer resins are based of cross-linkable acrylate, polyester, polysiloxane. Systems are known in which the pre-polymerized cross-linkable synthetic plastic is dissolved in organic solvents. Furthermore, aqueous systems on acrylate bases are known. Also, already proposed, solvent-free systems are utilized, in which a pre-polymer is dissolved in aqueous monomers. The monomers used as solvents are then bonded in the lacquer layer during hardening.

The known coating processes are complicated and pose environmental problems and health risks. Partially, also the desired or required mechanical properties, weathering properties and resistance against chemicals and solvents as well as optical properties are not satisfactory.

SUMMARY OF THE INVENTION

Accordingly, it is an object of the present invention to provide transparent cover plates of synthetic plastic material which can be produced in simpler and cost-favorable manner and possess good mechanical properties, good optical properties, a good weather resistance and resistance against aggressive substances.

In keeping with these objects and with others which will become apparent hereinafter, one feature of the present invention resides, briefly stated, in a transparent cover plate of a synthetic plastic material for a motor vehicle headlight or another motor vehicle light source, which at least at its outer side is provided with a coating of a transparent synthetic material, wherein in accordance with the present invention the coating is burnt powder lacquer.

In accordance with another feature of the present invention a method of producing the cover plate is proposed, wherein a preformed uncoated cover plate of a synthetic plastic material is heated simultaneously on a surface to be coated, the heated plate is treated during a sufficiently long time required for producing the desired layer thickness, with powder lacquer of a cross-linkable synthetic plastic material, with the temperature on the surface of the cover plate maintained so high that the powder is melted and flows to form a closed layer, and then the formed lacquer layer is burnt.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

In accordance with the present invention the cover plate for a headlight or another light source of a power vehicle is composed of a burnt powder lacquer.

Transparent cover plates must be composed of a transparent synthetic plastic material at least in their optical region, and their manufacture from economical reasons is performed by injection molding of thermoplastic synthetic plastics. Thermoplastic synthetic plastics are however heat sensitive in correspondence with their softening region, so that during thermal treatments or processing at high temperatures deformations of the cover plates must be taken into consideration. In a surprising manner it has been shown that such deformation can be avoided when a method is performed with highly reactive powder lacquers which melt at relatively low temperatures. Such lacquer powder melts at temperatures which are significantly below the melting region of the thermoplastic materials of the cover plates, so as to form a pore-free film with smooth outer surface and to provide the cover plate after its hardening with the desired properties. The inventive cover plates correspond to standards and regulations prescribed for the headlights. The rock impact strength lies for example within the prescriptions given in TRANS/SC1/WP29/GRE (sand jet test). Also a pronounced adherence is obtained. This is provided by the grid section value corresponding to the DIN 53151 Gt 0. The transmission value of the plate is not undesirably affected by the coating. The continuity characteristic of the coating is good. The surface of the lacquer satisfies the following continuity values (measured with wave scan device of the Firm Byk-Gardner):

Long wave characteristic value $\leq 3$ especially $\leq 2$

Short wave characteristic value $\leq 15$ especially $\leq 11$.

The coating is composed of a cross-linked synthetic resin, in particular a polyacrylate. Also, other powder lacquer systems can be used, such as based on polyester or polyurethane. The layer thickness of the coating lies in the optical region of the cover plate as a rule between 30 and 200 $\mu$m, preferably between 60 and 150 $\mu$m, normally between 80 and 120 $\mu$m. High layer thicknesses provide a good protection for the cover plates while to the contrary low layer thicknesses are preferably on cost reasons and can be used where the stress of the cover plates is low. As a rule, the layer thickness over 40 $\mu$m.

Because of the formation of the coating from burnt powder lacquer, in a surprising manner very uniform layer thicknesses are obtained. For example, in optical region of the cover plate, deviations in the layer thickness smaller than $\pm 10\%$, in particular smaller than $\pm 5\%$ can be maintained. In the edge region the deviations are less critical. In this region the layer thickness of the coating can be maintained smaller, in particular in the region between 40 and 60 $\mu$m.

It is especially advantageous when the cover layer of the inventive cover plate is composed of a 1-layer coating. Therefore, the layer is very uniform. Also, the production of the coated cover plate is less expensive.

The cover plate in accordance with the present invention is not only a cover plate, in particular a cover plate, for a headlight. It is also possible to form the cover plate as a combined chassis part which performs both the function of a cover plate and also the function of an orifice or a chassis part. For this purpose it is possible to make the optical regions impermeable and/or colored by painting or pigmenting of the powder lacquer. It is also possible for combined functions of light sources of motor vehicles, for example for rear lights, braking lights, blinking lights and rear headlights, to produce a cover plate of colorless transparent synthetic plastic by injection molding and then coat the same with powder lacquer which is differently color transparent in correspondence with the function of the light source.

The cover plate is as a rule three-dimensional object. Therefore it is necessary to avoid the deformations under the action of increased temperatures. The rear side or inner side of the cover plate is free of a coating, which provides an important advantage. This makes possible, with providing additional features, to avoid thermal deformations.

In accordance with the method for producing the cover plate of the invention, at least one surface to be coated on a pre-shaped, uncoated cover plate of a synthetic plastic material is simultaneously heated, the heated plate is treated during a sufficiently long time for producing the desired layer thickness with a powder lacquer-powder of a cross-linkable synthetic plastic material, the temperature on the surface of the cover plate is maintained so high that the powder is melted and forms a closed pore-free layer, and the thusly formed lacquer layer is then burnt.

Since the cover plates of synthetic plastic material have a relatively low heat capacity and heat conductivity, the heat quantity stored in the preheated cover plates suffices for providing a desired continuity of the coating and a good adhesive connection between the coating and the cover plate. Due to the provided heating of the cover plates, the coating device itself, for example conveyor bands, suspension devices, separating walls and the like can be maintained at normal temperature, so that the lacquer powder which does not connect to the cover plates and remains suspended can be again returned into the circulation. This provides for a very cost favorable and environmentally safe operation.

The formed lacquer layer is advantageously burnt directly at the end on the course of the surface layer. This is desirable since during burning, due to the increased temperature, a spreading can be improved as needed. On the other hand, because of the fast hardening, an undesired heating of the whole cover plate is avoided. Also, the formation of a uniform thickness is favorable when the hardening is performed immediately after the complete application of the molten layer.

The inventive method is preferably performed continuously, by transporting the cover plates one after the other through the various treatment stations without interruption.

Preferably, a low melting powder lacquer material is utilized, which in a molten state is low viscous and highly reactive. This makes possible the cost favorable production of the cover plates of thermoplastic synthetic plastics, in which a temperature resistance must not have a special value. Due to the low melting region of the powder lacquer material, the melting and burning can be performed at low temperatures when compared with the melting region of the thermoplastic synthetic plastics. The low viscosity after the melting provides a fast and accurate flow. The high reactivity of the powder material leads to a fast hardening, so that the heating time can be limited. This is advantageous on the one hand for the energy consumption and on the other hand for the shape stability of the cover plates. Preferably, such a powder lacquer material is utilized which in a melted condition initially has a melting viscosity of 300 to 6,000 mPa·s, in particular 1,000–3,000 mPa·s, and the viscosity increases fast with progressing cross-linking. Furthermore, advantageously a lacquer powder is utilized which is sintered at temperatures between 50 and 90° C. and melts at temperatures in the region of 70–130° C., in particular 80–120° C. The grain size of the powder material is preferably smaller than the desired layer thickness of the layer to be formed. The average grain size is advantageously in the region of between 15 and 55 $\mu$m, in particular 15–25 $\mu$m.

Lacquer powders which are suitable for forming a glass clear colorless coating are known. Preferably, they are high reactive acryl resins which contain epoxy groups. Such acrylates can be cross-linked with organic polyanhydrides or polyacids as a hardener. Suitable also are systems on the basis of carboxyl group-containing polyesters which can be cross-linked for example with triglycidylisocyanurate. Suitable further are systems on polyurethane basis.

The cover plates are preferably heated on their surface to be coated to temperatures in the region of between 80 and 170° C., in particular 100–140° C. for engaging the lacquer powder and its melting. The temperature of the surface can be measured by pyrometers. The heating for providing the melting temperatures can be performed by heating air and/or IR-radiation. Heating air alone or a combination of IR-radiation with heating air is preferable. As a rule it is advantageous to heat the surface of the cover plates at least to 20° C. above the upper temperature of the melting region of the powder lacquer material. Such a heating of the cover plate can be performed during a time period of 5–60 minutes, preferably 10–15 minutes.

Powder supplied to the surface of the cover plate with the lacquer powder is performed for example in a known manner in a stream. For example, conventional electrostatic gun can be used for this purpose, and however as a rule no voltage is applied. For example, the following conditions can be maintained: Transporting air 1.7 bar, dosing air 5.5 m$^3$/h; auxiliary air 0.3 m$^3$/h.

The heat quantity required for melting and distribution of the powder lacquer during coating as mentioned hereinabove, is provided exclusively by the preheated cover plate. The heating can be limited to the surface of the cover plate to be coated, so that no through heating of the cover plate is performed. Advantageously, the cover plate is coated on the surface which in use is an outer side, so that only this surface has to be heated. If desired, the rear side of the cover plate which does not have to be coated is cooled during pre-heating, coating and/or burning. Therefore, also the cover plates which are composed of heat sensitive materials can be used and their deformation can be avoided.

The powder coating is performed advantageously in one step, in other words, it is a one-time powder application. The layer thickness of the powder lacquer can be controlled boy the powder shut of powder discharge devices, in particular powder guns, by the time of the powder application, and/or the value of the temperature of the preheated plate. Theses parameters are advantageously determined relative to one another so that the powder during contacting with the heated surface is melted and is distributed to form the desired layer. The powder application is advantageously performed from several directions to insure the desired uniformity of the layer thickness. It can be however advantageous to maintain the thickness at the edge regions smaller than in the optical region of the cover plate. Thereby, the powder material can be economized. For avoiding an undesirable coating of the rear side of the cover plate and, when also the edge regions must not be coated, the locations which must not be located can be covered before the powder application. For avoiding some deformations of the cover plate, it can be supported before the heating, in particular clamped. Advantageously, the coating of the rear side and the support or clamping are performed so as to cover the rear side on the one hand and also to rigidify the plate on the other hand. When desired a cooling of the rear side of the cover plate, for example with cold air, can be performed through the covering.

It is especially advantageous when the covering or a clamping device are maintained at a low temperature by corresponding cooling so that the powder does not adhere to them. Thereby dirtying and undesired powder consumption are avoided. It is also advantageous when two cover plates, in particular different mounting sides, are connected with one another with their rear sides to the opposite covering, in some cases with interposition of a frame which seals the gap between the edges of the cover plates and seals them from one another. Supply and withdrawal conduits for cooling means, in particular cooling air, can extend through them.

When the cover plates are composed of synthetic plastic materials on which the coating cannot be applied with the desired adherence, it can be advantageous to perform a pre-treatment of the surface of the cover plate to be coated for improving the adhesive properties. Such a pre-treatment for improving the adhesive properties can be performed in physical or chemical ways. It is recommended to use a UV-radiation during a time of 5–50, preferably 10–20 seconds. Further physical method can include a plasma treatment or a surface adhesive corona treatment. Chemical treatments can include a treatment with oxidation means and in particular a treatment with silanes dissolved in solvents. Also, flame treatment can be utilized, as long as it does not affect optical properties.

The burning of the molten powder lacquer is performed for example at temperatures of 120–170° C., in particular 135–150° C. Preferably such temperatures are used, with which a deformation of the cover plate does not occur, and in some cases with the use of the above mentioned mechanical stabilization. The burning is advantageously performed by continuously transporting the cover plates through a burning chamber, similarly to the advantages during the prewarming. The heating during the burning can be performed further with circulating air and/or IR-radiation, wherein IR-radiation advantageously is combined with circulating air at the corresponding temperature. The burning is performed as a rule during a time of 10–60 minutes, in particular 25–35 minutes, depending on the reactivity of the powder lacquer material and burning temperature. After cooling of the coated cover plates they are ready for use without further treatment. The burnt powder coatings have a pronounced optical quality and a desired surface. Tests have been performed which show that when the cover plates for motor vehicle headlights are produced in this way they satisfy the requirements with respect the optical quality, mechanical strength and resistance against chemicals and solvents in an extraordinary manner.

The present invention is illustrated hereinbelow by several examples.

EXAMPLE 1

Three-dimensionally shaped cover plates produced by injection molding with a height of 100 mm, length 560 mm,, width 160 mm, and composed of polycarbonate to be used for a motor vehicle headlight are supplied with a rear side on a conveyor band. During their passage through a pretreatment station their outer side is irradiated with UV light during 10–20 seconds. Then the cover plates are transported further and supplied to a heating oven, in which they are heated during a time of 20 minutes with circulating air uniformly at 140° C. on their outer surface.

The heated cover plates are supplied into a powder coating cabin. There cold powder lacquer material of a highly reactive cross-linkable synthetic plastic is supplied from different directions by an electrostatic gun to the heated cover plate in an air stream of 0.3 $m^3/h$. The electrostatic guns are without voltage. The lacquer powder remains adhered to the surface of the cover plate and is converted by the heat of the cover plate into a well distributed melt. The coating time amounts to 20 seconds. The lacquer powder which does not adhere to the hot surface of the cover plate is caught, cooled and supplied back again into the powder container. Immediately after leaving the coating cabin the cover plates are transported to a further conveyor band which leads to a hardening oven. During this time a further distribution of the melt takes place, so that a completely smooth bubble-free surface is formed. Simultaneously, cross-linking of the polymers starts, connected with a substantial increase in the viscosity of the melt. In the hardening oven the formed layer is burnt at a circulating air temperature of 140° C. during a time of 45 minutes. After cooling the cover plate is ready to use without subsequent treatments. The ready to use coating has a layer thickness in the optical region of 120 $\mu m \pm 5\%$ and the side edges of the cover plates have a layer thickness of 40–60 $\mu m$. The layer adheres well to the cover plate and provides it with a good protection from stone impact and weathering as well as against action of cleaning media, fuels, oil and the like. The transmission measurement shows a value of 87%.

EXAMPLE 2

Example 1 is repeated and the control plate is clamped with its edges on rearwardly aerated supports which are transported together with the control plates. A cooling of the rear side of the control plates with a cold air is performed through the supports, for limiting the heating only to the upper surface of the control plates. The heating is performed by IR radiation. The control plates are composed in this example of polymethylacrylmethylimide (PMMI). The adherence of the coating to the control plate is so good that a pretreatment of the surfaces of the control plates for improving the adhesiveness can be dispensed with.

EXAMPLE 3

Example 1 is repeated, and two control plates are placed on another in pairs back to back with the use of a frame which compensates unevenness of edges and provides sealing, and are guided in suspension through individual stations. For improving adhesiveness, instead of the UV-radiation, a treatment of the surface with silanes dissolved solvents is performed. The powder coating is performed under the following conditions adjusted in a control device: transporting air 1.7 bar; dosing air 5.5 $m^3/h$; auxiliary air 0.3 $m^3/h$. It operates without voltage.

As highly reactive powder lacquer material for this example a polyacrylate powder and a polyester powder with the following composition is utilized:

|   |   | Weight Parts |
|---|---|---|
| 1. | Polyacrylate power | |
| | a) epoxy group containing polyacrylate | 71.5% |
| | b) hardener (polyanhydride) | 24% |
| | c) degassing agent | 1.5% |
| | d) spreading agent | 1% |
| | e) UV-absorber | 1.5% |
| | f) stabilizer | 1.5% |

The average grain size of the lacquer powder is 20 μm. The melting region is between 80 and 100° C.

|   |   | Weight Parts |
|---|---|---|
| 2. | Polyester power | |
| | a) carboxyl group containing polyester (spreading agent containing) | 86.8% |
| | b) cross-linking agent | 9.7% |
| | c) degassing agent | 0.5% |
| | d) UV-absorber | 1.5% |
| | e) stabilizer | 1.5% |

The average grain size of the lacquer powder is 20 μm. The melting region is from 90 to 100° C.

It will be understood that each of the elements described above, or two or more together, may also find a useful application in other types of constructions and methods differing from the types described above.

While the invention has been illustrated and described as embodied in a transparent cover plate of plastic for motor vehicle headlight and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A transparent cover plate composed of a synthetic plastic material for motor vehicle headlights and other light sources, comprising a plate part composed of a thermoplastic material and having an inner side and an outer side; and a coating composed of a transparent synthetic plastic material and provided at least on said outer side, said coating being composed of a burnt powder lacquer having a melting point which is substantially lower than a melting point of said thermoplastic material.

2. A transparent cover plate as defined in claim 1, wherein said coating is composed of a cross-linked synthetic plastic resin.

3. A transparent cover plate as defined in claim 2, wherein said cross-linked synthetic plastic resin is polyacrylate.

4. A transparent cover plate as defined in claim 1, wherein said coating has a layer thickness in an optical region of said plate part of 30–200 μm.

5. A transparent cover plate as defined in claim 4, wherein said layer thickness is 60–150 μm.

6. A transparent cover plate as defined in claim 4, wherein said layer thickness is 80–120 μm.

7. A transparent cover plate as defined in claim 1, wherein said coating has a layer thickness with a deviation in an optical region of said plate part smaller than ±10%.

8. A transparent cover plate as defined in claim 7, wherein said deviation is smaller than ±5%.

9. A transparent cover plate as defined in claim 1, wherein said coating has a layer thickness in an edge region of said plate part which is lower than in an optical region of said plate part.

10. A transparent cover plate as defined in claim 1, wherein said coating is a one-layer coating.

11. A transparent cover plate as defined in claim 1, wherein said inner side of said plate part is not coated with a powder lacquer.

12. A transparent cover plate as defined in claim 1, wherein said plate part is three-dimensional.

* * * * *